Feb. 17, 1970   R. J. ADAMS   3,495,466
MULTIPLE MOTION APPARATUS
Filed March 28, 1968   6 Sheets-Sheet 1

INVENTOR
ROBERT J. ADAMS
BY
Miller Morris Pappas & McLeod
ATTORNEYS

INVENTOR
ROBERT J. ADAMS

Feb. 17, 1970    R. J. ADAMS    3,495,466
MULTIPLE MOTION APPARATUS
Filed March 28, 1968    6 Sheets-Sheet 3
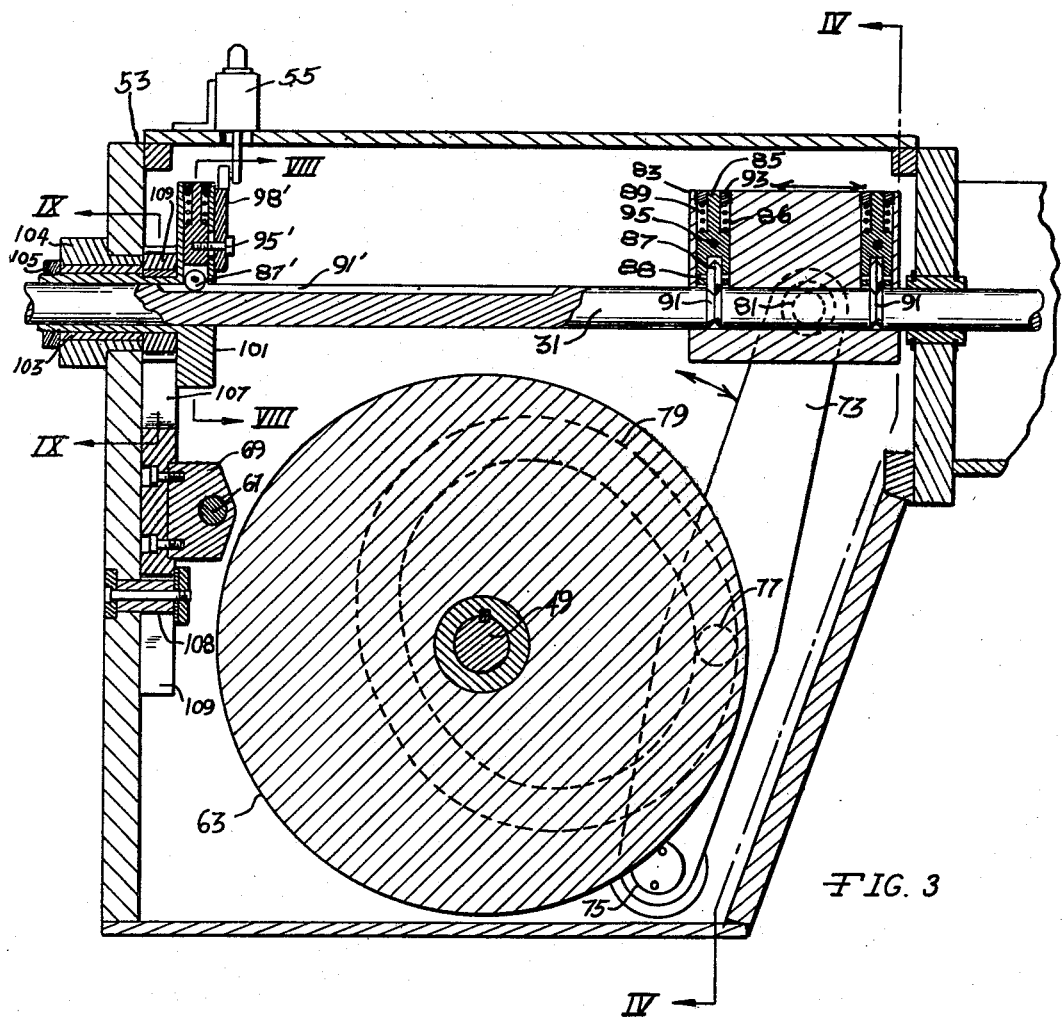
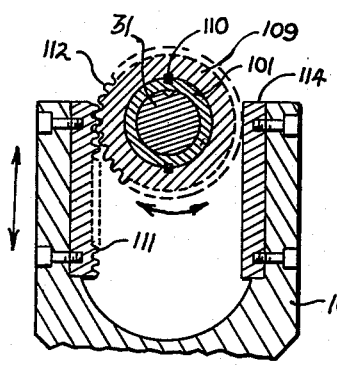
INVENTOR
ROBERT J. ADAMS
BY
ATTORNEYS

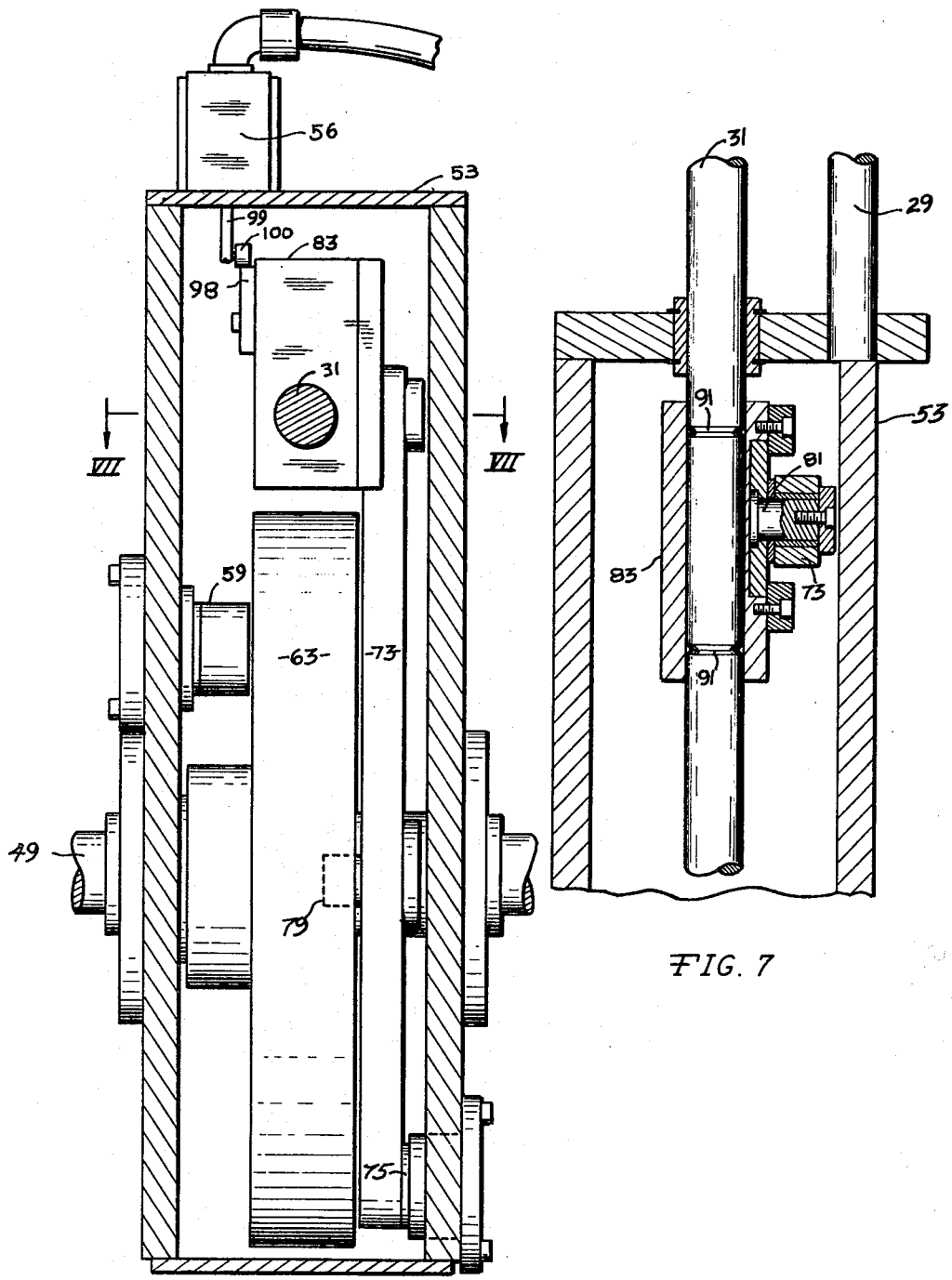

Feb. 17, 1970  R. J. ADAMS  3,495,466
MULTIPLE MOTION APPARATUS
Filed March 28, 1968  6 Sheets-Sheet 5

INVENTOR
ROBERT J. ADAMS
BY Miller Morriss Pappas & McLeod
ATTORNEYS

United States Patent Office 3,495,466
Patented Feb. 17, 1970

3,495,466
MULTIPLE MOTION APPARATUS
Robert J. Adams, Lansing, Mich., assignor to Adams Tool & Engineering, Inc., Lansing, Mich., a corporation of Michigan
Filed Mar. 28, 1968, Ser. No. 716,868
Int. Cl. F16h 21/00, 25/08, 37/16
U.S. Cl. 74—23                                    10 Claims

ABSTRACT OF THE DISCLOSURE

A motion for a transfer device having finger bars which describe rectangular motion. The resultant cycle may be characterized as clamp-advance-unclamp-return. A specific motion transmission is presented to translate rotary motion into double motion of a cylindrical bar, viz, translation and rotation on the same axis. Rotary motion is transmitted by a cam following lever to a scotch yoke which turns a rotary carriage on an axis substantially coincident with that of the bar. The rotary carriage is provided with at least one wheel engaged in an axial slot on the surface of the bar. Rotary carriage motion is transmitted to the wheel structure which imparts a sidewise thrust to the slot, and thereby rotates the bar. A wheel structure is specifically utilized in the bar slot so that the bar may axially translate relative to the rotary carriage, with a minimum of friction and without interference with the rotary motion structure. The wheel is tapered, as is the groove, and therefore the wheel will disengage sidewise from the groove when a predetermined magnitude of resistance against rotation is encountered. This feature provides a reliable and smooth fail-stop.

An analogous structure is provided for transmission of axial displacement to the bar. Another cam following lever reciprocates a translatory carriage which also has a wheel engaged in a circumferential groove on the bar, which permits the bar to rotate relative to the carriage; and the wheel also will jump sidewise from the groove under a predetermined magnitude of resistance to bar translation.

Limit switches are included and are actuated when either thrust wheel jumps its track; the switches disconnect the main drive to shut down the entire apparatus.

BACKGROUND OF THE INVENTION

The present invention is associated with the generation of motion for transfer devices providing rectangular motion at each of a pair of motion bars, or finger bars. Such transfer devices are commonly used in connection with press operations where the transfer device is utilized to continuously and automatically feed blanks to a press station, and/or remove the formed part from the station after press formation. In a standard application of such transfer means a pair of finger bars are equipped to move inwardly and outwardly upon a blank or part, and also to move toward and away from the die station. This motion advances an item and then returns to advance subsequent items in continuous succession. The general type of motion involved, as well as prior means for delivering such motion, may be seen in the figures on pages 193–196 of Machinery, for June 1957. This illustration shows a pair of cams on a power shaft, where one of the cams generates a clamp-unclamp motion at the "finger channels" or finger bars, and the other cam generates an advance-return stroke of the finger bars. It can be seen that the linkage between the cams and finger bars, for either of the motions discussed, involves a series of levers connected to rack and pinion movements. The clamp-unclamp motion is generated by rotation of the drive tube which in turn actuates the rack and pinion linkage to the finger bars. The advance-return motion is generated by another rack and pinion mechanism, independently of the drive tube. Thus, separate motions are delivered to the finger bars without mutual interference, by the use of wholly independent transmission structures.

SUMMARY OF THE INVENTION

My invention utilizes a pair of levers driven from cam means on a primary drive shaft, all of which is similar in concept to the prior art structures described above. However my apparatus departs from these known structures in that it delivers both motions to the finger bars through the drive tube. That is, the drive tube itself both reciprocates in the direction of its longitudinal axis, and also rotates on that same axis. These displacements will hereinafter be referred to respectively as "reciprocal axial translation" and "reciprocal axial rotation." The first mentioned displacement develops the advance-return movement of the finger bars, and the second generates the clamp-unclamp motion of the fingers themselves, on the bars. The drive tube of my invention is preferably a solid cylindrical bar and will be hereafter termed a "drive bar." However it should be appreciated that other rod configurations could be substituted, and that "cylindrical" herein broadly includes non-circular cross sections.

The central problem in such single bar motion is that of transmitting each of the different motions to the bar, without interference or restriction of the other motion. This problem has led to the prior art usage of double structures for each finger bar. In this approach, one structure, such as a drive bar, is rotated to generate clamp-unclamp motion, while the other drive bar structure is translated to generate advance-return motion. The independent structures avoid the problem of interference between motions.

My invention has a separate, cam actuated lever for each of the desired motions; however only one drive bar is associated with a finger bar, and each of the levers is driveably connected to the drive bar. One lever is oriented to controllably translate the bar in an axial direction, while the other lever rotates the bar axially. As in the prior art, the pair of levers are each actuated from cam means on a central or main drive shaft. The planes of motion of the two levers are substantially perpendicular.

A first translatory lever (T-lever) is pivoted to have one end reciprocate in the axial direction of the drive bar. The reciprocating end of the T-lever is connected to a translatory carriage (T-carriage) to which is mounted one or more relatively small thrust wheels. The wheels are axled in the carriage so as to be spinnable thereon. The T-carriage is supported on the drive bar which may actually be journalled through the carriage structure. This particular mounting is structurally economical but not functionally necessary. The wheels are mounted for spin in a plane perpendicular to the axis of the drive bar and are spring loaded into a track or groove which passes circumferentially around the bar. Thus, when the T-lever reciprocates the carriage, the sidewise motion thrusts the wheel against the side of the groove in which it is engaged, and thereby transmits the translatory motion to the drive bar. Rotational freedom of the bar is preserved because the wheel spins freely in the groove during bar rotation. Thus, a very minimum of frictional resistance is offered to bar rotation.

These features should be contrasted with prior art devices in which, in place of the wheels, slot rings were keyed into sliding frictional contact with circumferential slots on the bar. Such a structure generated sliding frictional contact between the groove and ring under bar rotation. The sliding friction developed a higher magnitude of friction, requiring lubrication. In addition such structures would wear down more rapidly, thereby introducing play into the linkage.

Perhaps the most important distinction of the present invention is that the wheels are spring loaded and will therefore easily pop out of their groove under a predetermined axial displacement thrust. Thus, the invention presents a very novel fail-stop mechanism, in which a hang-up of the transfer mechanism causes a quick and smooth disconnect of the displacement drive. This eliminates the problem of damage to the parts being transferred; or damage to the transfer mechanism itself, particularly at the carriage structure or associated linkage. The wheels have a V-shaped cross sectional profile, as does the registering track, facilitating disengagement under excessive loads. The wheel slides up the incline of the V without binding or damaging the wheel or track structures.

Some prior art devices incorporated fail-stop mechanisms in the nature of shear pins or other such structures which were necessarily destroyed upon a fail-stop. There are problems inherent in such a fail-stop. Firstly the shear pin or other failed structure must be replaced, and secondly the carriage or other linkage to the bar must be properly positioned thereon so that proper timing of the reciprocation is not altered. This restoration of proper timing is tricky and time consuming. By contrast the instant invention does not involve a failure of any structure under a fail-stop. And in addition it is easily and automatically restored to proper cycling merely by moving the carriage until the wheels re-engage in the track or groove on the bar.

Fail-stop is executed by limit switch means positioned to be actuated by disengagement of the wheels from the bar grooves. Disengagement from the track involves outward radial motion of the thrust wheels against resilient means which hold them in the track. This outward motion is utilized to actuate a switch which disconnects the main drive means from the transfer apparatus. The thrust wheel linkage of my invention permits zero clearance between the reciprocating carriage and its wheel connection to the drive bar, thereby eliminating all mechanical sloppiness thereat. Although dimensions may change under wearing, the spring loading of the thrust wheel automatically urges it into continuous contact with the groove. This is all made possible by the incorporation of rolling, rather than sliding, rotational surfaces. Moreover, the rolling friction is much less in magnitude than is that produced by the prior art sliding frictional ring, or other such structures.

An analogous mechanism is provided to deliver rotary motion from the central drive to a rotational carriage (R-carriage) which is also mounted in an axially slidable relation concentrically on the drive bar. This R-carriage, instead of translating in the axial bar direction, rather rotates around the bar, about the center thereof. The carriage rotation is transmtited to the bar by one or more thrust wheels mounted on the carriage and urged into axial grooves on the bar. Thus the same general concept of motion transmission is utilized on the R-carriage as has been already described for the T-carriage. The wheels spin freely in the axial grooves when the bar translates. Thus the independence of motions is preserved. Also, as in the T-carriage srtucture, the thrust wheels will easily slip up out of the groove under a predetermined rotational thrust load. And finally, an actuator plate is provided and linked to the thrust wheel so that radial outward wheel motion, under excessive load disengagement, urges the plate radially outward to trip a limit switch. The switch disconnects the main drive, to prevent damage to parts, blanks, or the transfer structure itself. The same advantages over previous known structures inhere in the R-carriage mechanism, as inhere in the T-carriage already described.

Each single drive bar of my invention is connected to a transfer finger bar, through a rather basic mechanism. The drive bar is journalled through a pair of spaced apart finger bar carriers. The drive bar is free to rotate in the carriers, but the carriers are constrained to translate axially with the drive bar. Each pair of carriers supports a finger bar, which moves rigidly in axial translation with the carrier. The finger bar is mounted on the carrier for lateral, or sidewise, traversal thereon to produce clamp-unclamp motion. The clamp-unclamp reciprocation is generated by rotational reciprocation of the drive bar through a simplified rack and pinion linkage on the finger bar carrier.

In operation, the T- and R-levers are cam synchronized to generate motion in the drive bar in the following order: Translational advance, clockwise rotation, translational return, and finally counterclockwise rotation. This sequence of motions is converted to corresponding finger bar motion as follows: Advance, unclamp, return, and clamp. When any motion encounters undue loading the thrust wheels automatically disengage from the drive bar and fail-stop occurs. After the difficulty or obstruction has been corrected or removed, the drive bars may then be moved until the wheels re-engage with the drive bar. Since no structure has failed or distorted, the structure automatically re-engages in correct synchronism. No down time is necessary to restore proper cycling.

The solitary drive bar (one for each finger bar) is also superior to prior art methods of transmitting multiple motion, wherein double bars were used, one transmitting axial rotation and the other transmitting axial translation, to the finger bar structure.

Accordingly the objects of this invention are to provide the following:

A new and useful transfer device;

A transfer device having rectangular motion in which all four motion strokes are delivered to the motion bar by a single drive bar;

A motion transmission for generating independent axial translation or rotation in a cylindrical drive bar;

A multiple motion transmission which automatically disengages under a predetermined resistance to any one of the motions generated;

A multiple motion transmission through a single drive bar having rolling instead of frictional cross slip;

A multiple motion generator for a transfer device which is relatively inexpensive to produce and maintain;

A particular motion generator for a transfer device which automatically restores to correct timing after a fail-stop;

Other objects will become apparent upon reading the present description, drawings, and claims.

IN THE DRAWINGS

FIGURE 3 is a sectional view taken at lines III—III of FIGURE 1, and shows the central cam wheel and the cam following translation lever, and shows also the assemblies of the rotation and translation carriages.

FIGURE 4 is a sectional view of the central drive cam of the present invention and the translation lever associated therewith, taken at lines IV—IV of FIGURE 3.

FIGURE 7 is a section view of the drive unit of the present invention, taken at lines VII—VII of FIGURE 4.

FIGURE 9 is a sectional view through the rotary carriage structure of the present invention, taken at lines IX—IX of FIGURE 3.

DESCRIPTION OF PREFERRED EMBODIMENT

Figure 1:
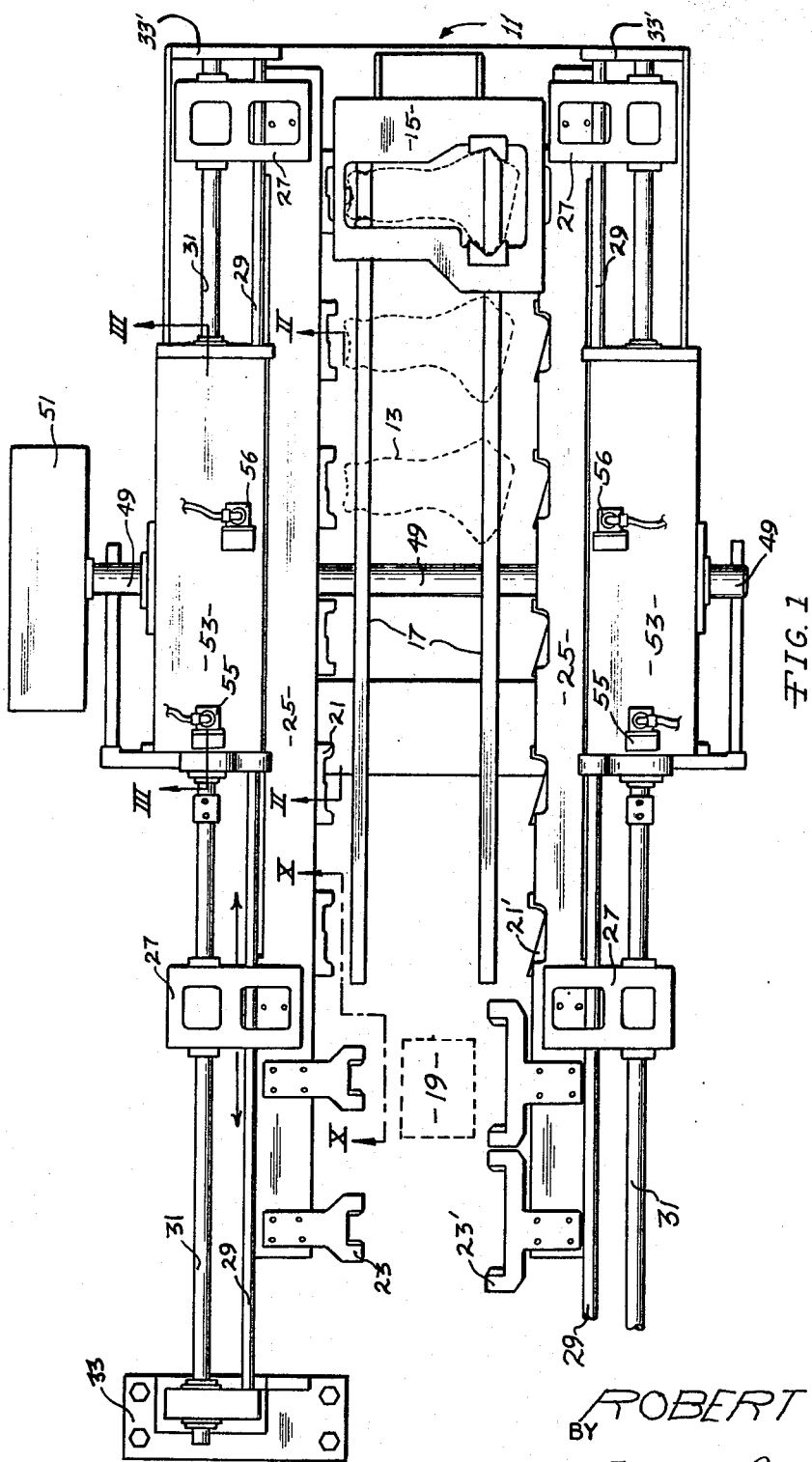
FIGURE 1 is a top plan view of an entire transfer apparatus embodying the present invention, and shows the finger bars thereof, and blank parts being moved thereby, in phantom line.

In FIGURE 1 is seen the overall apparatus of which this invention comprises an essential element. The structure seen in the top plan view of FIGURE 1 is a transfer device, denoted generally by the numeral 11. The particular transfer device shown is adapted to move blanks 13 from the hopper 15 and advance them down the ways 17 toward the press station in the region denoted by the numeral 19. The press and die structure itself, at station 19, is not shown. However the blanks 13 are deposited at 19 into a die bed and supported thereon, with the die at substantially the same vertical elevation as the ways 17. The fingers 21 and 21' are specially adapted to grasp the particular end configuration of blanks 13 being handled. Different fingers may be substituted for differently configured blanks. The fingers are shown in FIGURE 1 in the spread, or unclamp, position, and of course must be clamped or pinched inwardly against the blanks prior to advancing them toward the station 19. Each cycle carries a blank forward on the tracks 17 to a position where, after an unclamp and return stroke, the next finger picks up the blank and advances it again one station. Thus the blanks move stepwise toward the press as the finger bars describe a rectangular cycle of clamp-advance-unclamp-return. Since the die and press render the blank into an entirely different new shape at station 19, the formed part fingers 23 and 23' are shaped dissimilarly from the blank fingers 21 and 21'. All of the fingers 21, 21', 23 and 23' extend rigidly inward from a finger bar 25, which is supported by the finger bar carriers 27. The carriers 27 are slidably mounted on the static guide rods 29. The carriers 27 reciprocate on the guide rods as indicated by the arrows. The reciprocal translation is delivered to the carrier by the drive bar 31, which axially translates with respect to its end journal assemblies 33 and 33'. Naturally the mirror image of the motion of each finger bar, is executed by the other.

Figure 10:
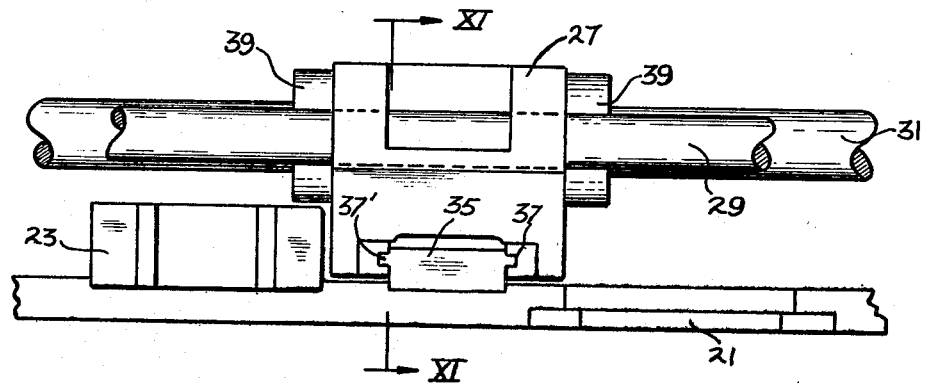
FIGURE 10 is a side elevational view of the finger bar carrier structure, showing its relation to the drive bar, the static guide bars, and finger bar, of the present invention, and is taken on lines X—X of FIGURE 1.
Figure 11:
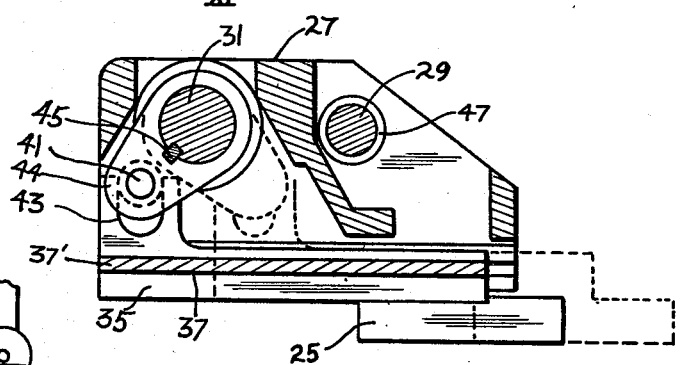
FIGURE 11 is a sectional view of the internal mechanism of the finger bar carrier of the present invention, taken at lines XI—XI of FIGURE 10.

The clamp-unclamp motion of each finger bar 25 is generated by rotation of the drive bar 31 and can be best appreciated by reference to FIGURES 10 and 11. The clamp-unclamp transmission bar 35 is seen mounted in the slide slot 37 by the slide tongue 37'. Drive bar 31 is locked to the carrier in the axial translation direction by the collar bearings 39 which move the carrier 27 in axial translation with the bar 31, but at the same time leave the bar free to rotate in a journalled relation with respect to the carrier. FIGURE 11 shows the internal workings of the carrier structure, particularly the clamp-unclamp stroke as generated by the pinion member 41 driving the rack portion 43 of the transmission bar 35. The pinion structure is rigidly connected by leg 44 to the drive bar 31 for rotation therewith at slot key 45. The mechanism is shown in solid line at the unclamp position; the broken line depicts the alternate, clamped position. Guide bar 29 can be seen slidably supporting the carrier structure inside the bushing 47.

Returning temporarily to FIGURE 1, the general layout of the entire apparatus may be appreciated by noticing the main drive shaft 49 leading in from the main power source at 51. The main shaft 49 passes through identical compartments 53 in which are mounted the timing cam wheel and rotational and translational levers which transmit these respective motions from the cam wheel to the drive bars 31. The numerals 55 and 56 represent the external connections of limit switches which are positioned inside the compartments 53 and perform a fail-stop function to be explained.

Figure 2:
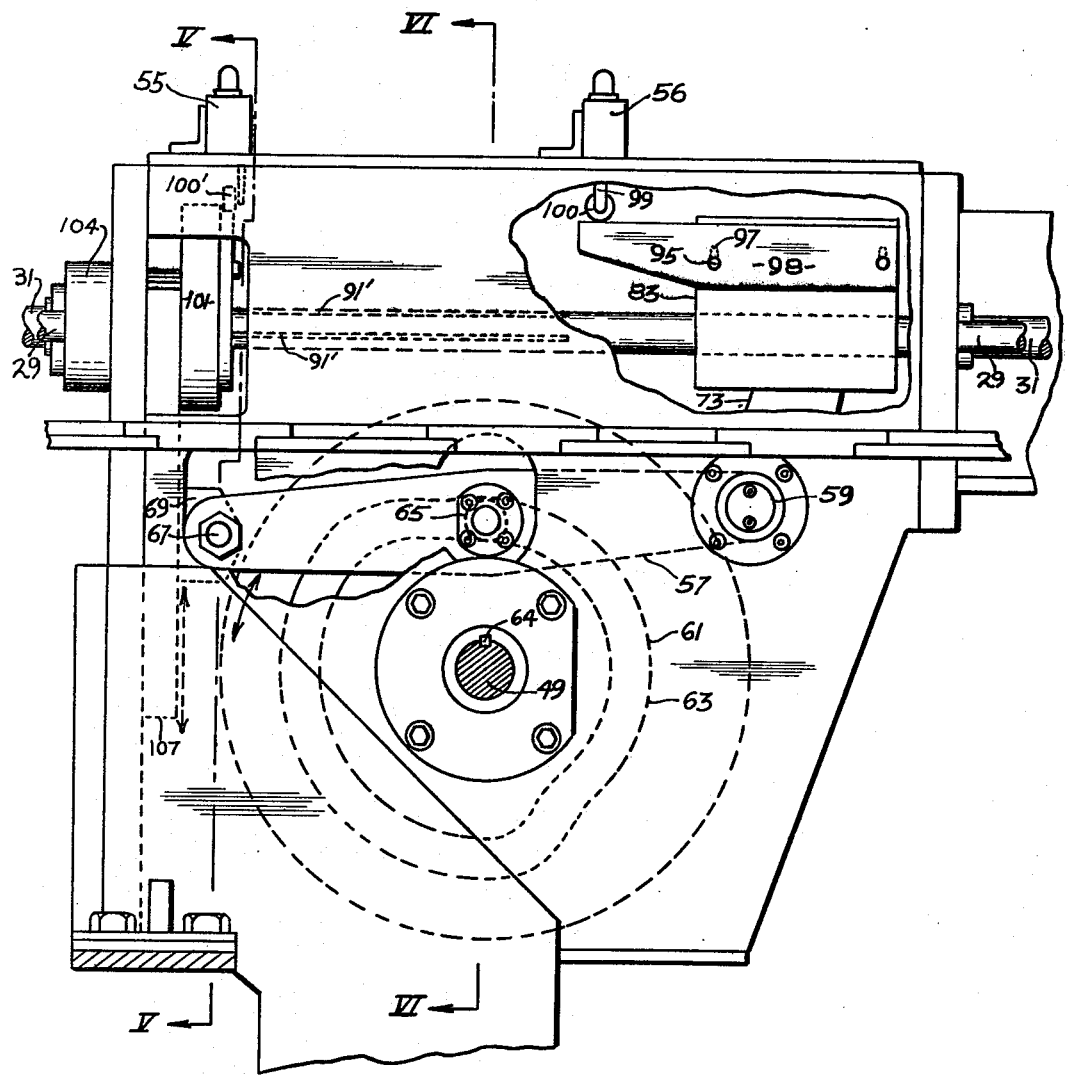
FIGURE 2 is a partially broken away side elevation view of a drive unit containing the multiple motion transmission of the present invention, and is taken on lines II—II of FIGURE 1. The central cam wheel is shown in phantom line, as is the cam following rotation lever.

FIGURE 2 shows the main drive shaft 49 and timing structure mounted thereon. The rotational lever (R-lever) 57 is fulcrumed at 59 to follow the cam track 61 on the cam wheel 63. The wheel 63 is locked to the shaft 49 by the key 64. The cam follower pin 65 slides in the rotational cam track (R-track) 61. The eccentrically configured track generates a reciprocal motion (see arrow) at the free end of the lever 57 which is pin connected at 67 to the hinge block portion 69 of a scotch yoke. The scotch yoke rotates a rotary carriage (R-carriage) which will later be described in more detail.

FIGURE 3 shows the translation lever (T-lever) 73 pivoted at 75 for reciprocal actuation by the cam wheel 63. The cam following pin 77 slides in the second cam track (T-track) 79, which is on a wheel face opposite to the face seen in FIGURE 2. The free end of the lever 73 oscillates (see arrow) and is pin connected at 81 to the translational carriage (T-carriage) 83.

A pair of wheel mounts 85 are fitted into channels 86 on the carrier 83, for vertical sliding movement therein. The mounts 85 are forked at the bottom, for a thrust wheel 87 which is journalled on the fork pin 88 and is freely spinnable thereon. The mounts 85 are resiliently loaded downwardly by the coil springs 89. The spring loading urges the tapered, or V-shaped wheel into the registering V-profiled groove 91 on the drive bar 31. The T-carriage motion (see arrows) is thus transmitted through the wheel 87 to the groove 91 to generate a corresponding axial reciprocation in the drive bar 31. At any point in this cycle, however, the drive bar is free to rotate on its longitudinal axis with respect to the T-carriage 83, because the wheel 87 will revolve smoothly on the groove 91. This provides a rolling, rather than a sliding, interface with the usual superior frictional characteristics.

It is also important to appreciate that the registering cross section profiles of the wheel and groove provide an especially advantageous fail-stop structure. If a hangup occurs in the transfer apparatus, and creates undue resistance to axial bar translation, the wheels will slide laterally up the inclined groove surface and disengage from the groove. This effectively disconnects the T-carriage 83 from the drive bar 31, and thereby avoids damage to the transfer apparatus or the objects being transferred. The axial load at which disconnect occurs may be adjustably preset by the screws 93 which adjust the compression of springs 89.

Connector pegs 95 are seen in FIGURE 2 as projecting through slots 97 in the side of the T-carriage structure to connect to the exterior limit switch plate 98. Thus, when the wheels disengage from the groove in a hangup of bar 31, the wheel mounts 85 move vertically, i.e. radially away from the bar, the carry the plate 98 upward where it actuates the plunger 99 of limit switch 56. The plunger 99 is in continuous contact with the plate 98 through the intermediate roller 100. The limit switch disconnects the electric power to the main drive, shutting down the entire apparatus.

Figure 5:
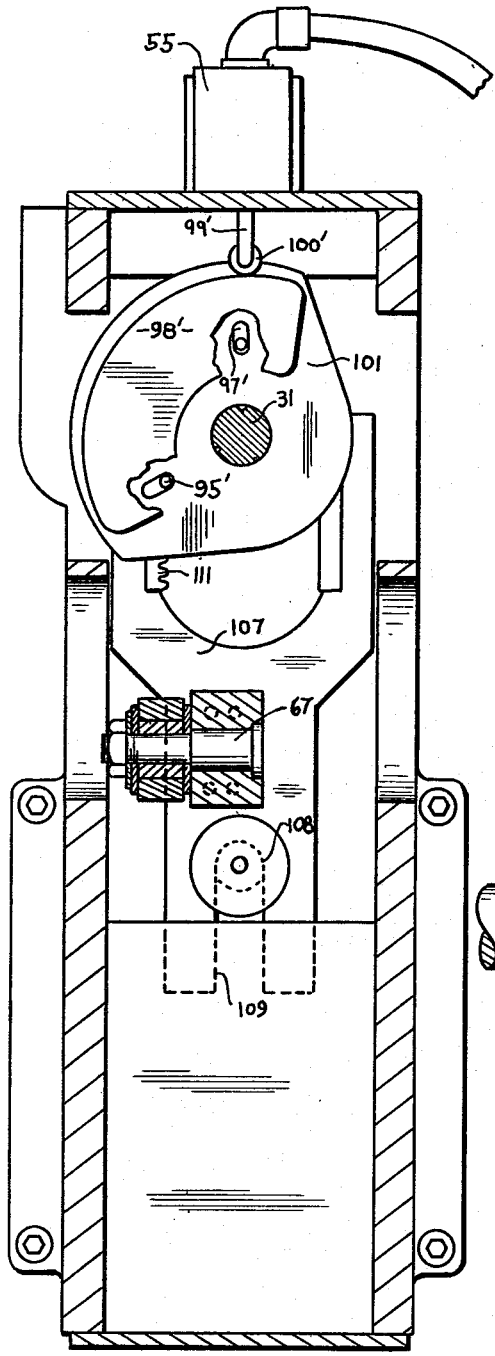
FIGURE 5 is a sectional view of the apparatus of the present invention taken on lines V—V of FIGURE 2.
Figure 8:
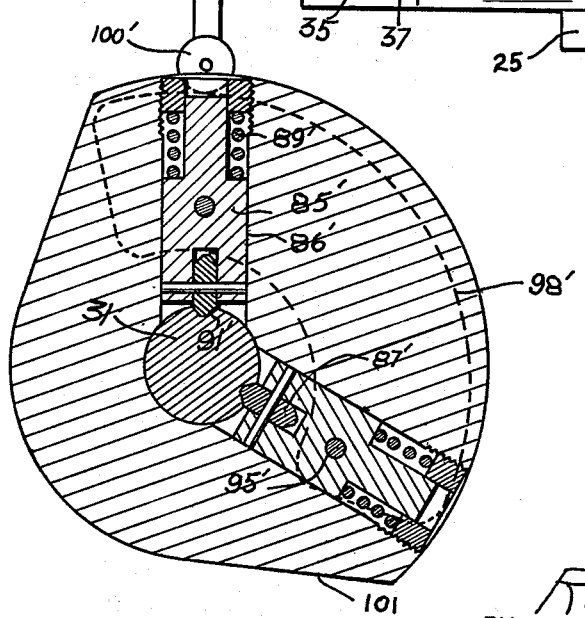
FIGURE 8 is a sectional view through the rotary carriage structure of the present invention, taken at lines VIII—VIII of FIGURE 3.

FIGURE 8 depicts the mounting of the R-carriage 101. The carriage is coaxially mounted about the drive bar 31. Intermediate bearing structures may be seen in FIGURES 3, i.e. the sleeve bearing 103 and collar 104, with the entire assembly retained by the lock nut 105. Intermediate the R-carriage 101 and wall 53 of the compartment, is fitted the scotch yoke 107, with the drive bar 31 passing through the crotch thereof. The pinion gear 109 is keyed at 110 to the R-carriage 101 so as to be engaged by a rack portion 111 of the scotch yoke 107, as seen in FIGURE 9. Vertical reciprocation of the yoke 107 is thereby converted to rotary reciprocation (see arrows) of the R-carriage 101 at the teeth 112 of the carriage pinion gear. A wear plate 114 is provided on the yoke opposite from the rack 111. FIGURE 5 shows the pin 108 and channel 109 as a structure for guiding of the vertical reciprocation of the yoke 107.

Referring again to FIGURE 8, the rotary carriage is seen to contain mounts 85' for thrust wheels 87', resiliently loaded downwardly in channels 86' by the coil spring 89' to engage the wheel in the axial bar slot 91'. Rotation of the carriage by the yoke 107 transmits rotary motion through the wheels 87' to the drive bar 31. Connector pegs 95' lift the circular limit switch plate 98' against the roller 100' for a fail stop actuation of the limit switch 55. During normal operation the roller rides continuously on the plate periphery. Fail-stop occurs at an adjustably predetermined rotational load, which causes the thrust wheel 87' to ride upwardly and outwardly out of the axial slot 91'.

Figure 6:
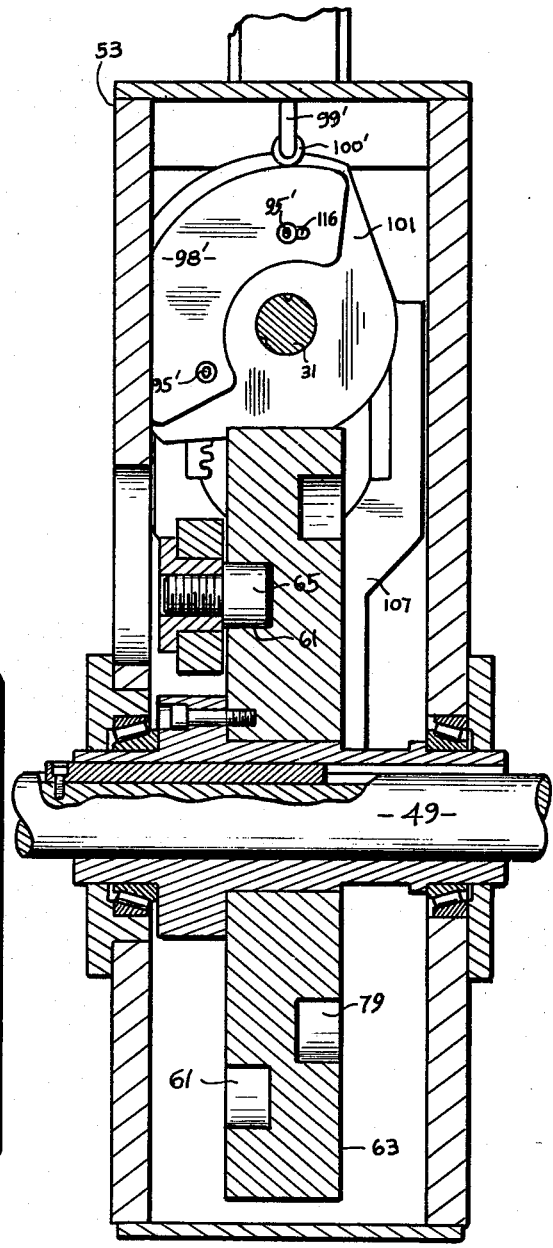
FIGURE 6 is a sectional view taken at lines VI—VI of FIGURE 2 and shows the central cam wheel connected to the main drive shaft, as well as the cam tracks on the cam wheel, which are followed by each of two cam levers.

An auxiliary slot 116 is seen provided on the switch plate 98' (FIGURE 6). This is necessitated by the fact that the extension pins 95' each move radially outwardly and would tend to structurally separate the plate 98' under such motion. The slot 116 permits the pin 95' to move therein somewhat circumferentially, to avoid this problem.

Although a single thrust wheel will theoretically accomplish the described function on either carriage, two thrust wheels are preferred, to give longer life, and to give also a more distributed displacement. The T-carriage wheels are deliberately spaced less than 180° apart, so as to preclude accidental improper mounting of the R-carriage on the bar 31. At 180° spacing it would be possible to mount the R-carriage in either of two orientations, only one of which would be correct for yoke actuation.

The above description of an operative embodiment of my invention will enable those skilled in the art to perceive modifications, substitutions, and adaptations therefor, all of which are to be included within the spirit of the present invention, the scope of which is limited only by the hereinafter appended claims.

I claim:
1. A rotary motion transmission comprising:
   a cylindrical drive bar, supported for rotation and translation with respect to its longitudinal axis;
   an axial track on said bar;
   a rotational carriage disposed adjacent said track and displaceable rotationally about said bar axis;
   means for controllably rotating said carriage about said bar axis; and
   thrust wheel means mounted on said carriage, and movable thereon toward and away from said bar;
   whereby rotational reciprocation of said carriage is imparted to said bar without restriction of its translatory freedom.

2. The structure of claim 1 further defined as follows: said wheel and said track formed with substantially V-shaped cross sectional profiles to mutually register, and mutually disengage under a predetermined magnitude of sidewise (rotational) thrust between said wheel and track.

3. The structure of claim 2 wherein the carriage is guidably and slidably mounted on said drive bar.

4. The structure recited in claim 3 with the additional structure comprising:
   a sensing device mounted for actuation by said disengagement of said wheels from said tracks, to disconnect said axial rotation means.

5. A multiple motion generator comprising:
   a cylindrical drive bar, supported to rotate and translate freely on a longitudinal axis, and having a first, circumferential track and a second, axial track;
   first, translation carriage means disposed adjacent said circumferential track, and translatable parallel to said bar axis;
   first thrust wheel means carried by said first carriage means and normally, but yieldably, urged thereby to a circumferentially running engagement in said circumferential track, and sidewise thrustable thereagainst;
   second, rotational carriage means disposed adjacent said axial track, and rotatable about said bar axis;
   second, thrust wheel means carried by said second carriage means and normally but yieldably urged thereby to an axially running engagement in said axial track, and sidewise thrustable thereagainst;
   means for controllably oscillating said translation carriage parallel to said bar axis; and
   means for controllably oscillating said rotation carriage about said bar axis;
   whereby said bar is simultaneously and independently translatable and rotatable with respect to said bar axis.

6. The apparatus of claim 5 wherein at least one of said associated wheel and track structures are co-operatively formed for disengagement under a predetermined magnitude of sidewise thrust therebetween.

7. A translatory motion transmission comprising:
   a cylindrical drive bar, supported in freedom to axially rotate and translate;
      a circumferential groove groove track on said bar
      a translation thrust wheel normally running in engagement with said groove
      resilient means urging said translational thrust wheel in said groove of said drive bar;
   whereby said bar may be axially moved without restriction of its axial freedom to rotate.

8. A translatory motion transmission comprising:
   a cylindrical drive bar supported for translation and rotation with respect to its longitudinal axis;
   a circumferential V-shaped groove track on said bar;
   a translatory carriage disposed adjacent said track and displaceable parallel to said bar axis;
   means for axially translating said carriage parallel to said bar axis;
   thrust wheel means having V-shaped cross section profiles registrable in said circumferential track;
   resilient means on said carriage urging said thrust wheel means into engagement with said track and permitting disengagement therefrom under a predetermined magnitude of axial thrust as between said wheel means and said track whereby carriage movement is imparted to said bar without restriction of the rotational freedom of said bar; and
   a sensing device mounted for actuation by disengagement of said wheels from said track to disconnect said axial translating means.

9. A rotary motion transmission comprising:
   a cylindrical drive bar supported in freedom to axially rotate and translate;
   an axial track on said bar formed as an axial V-groove therein
      a rotational thrust member disposed in said axial track and freely displaceable in said groove relative to said bar and in mating V relationship in said groove track;
      a resilient means urging said thrust member into normal engagement in said longitudinal groove track,
   whereby said bar may be rotated on its axis without restriction of its translatory freedom.

10. A multiple motion generator comprising:
   a cylindrical drive bar, supported to freely rotate and translate on a longitudinal axis, and having a first, circumferential V-groove track and a second, V-groove axial track;
   translational thrust wheel means matingly disposed in said first track to thrust sidewise thereagainst and to freely displace circumferentially therein, relative to said bar;
   resilient means for pushing said translational thrust means sidewise against said first track;
   rotational thrust wheel means matingly disposed in said second track to thrust sidewise thereagainst and to freely displace axially therein, relative to said bar; and resilient means for pushing said rotational thrust means sidewise against said second track.

References Cited

UNITED STATES PATENTS

| | | | |
|---|---|---|---|
| 52,843 | 2/1866 | Gitt | 74—44 |
| 392,045 | 10/1866 | Loth et al. | 74—44 |
| 2,349,314 | 5/1944 | Truesdell | 74—56 |
| 2,578,026 | 12/1951 | Tayor | 74—25 |
| 2,856,781 | 10/1958 | Forbes | 74—56 |

FRED C. MATTERN, Jr., Primary Examiner

W. S. RATLIFF, Jr., Assistant Examiner

U.S. Cl. X.R.

74—45, 56